(12) United States Patent
Lin

(10) Patent No.: US 7,314,251 B1
(45) Date of Patent: Jan. 1, 2008

(54) CHAIR BACKREST ATTACHMENT STRUCTURE

(75) Inventor: Wen-Sheng Lin, Kaohsiung (TW)

(73) Assignee: Maxchief Investments, Ltd (CN)

( * ) Notice: Subject to any disclaimer, the term of this patent is extended or adjusted under 35 U.S.C. 154(b) by 0 days.

(21) Appl. No.: 11/678,675

(22) Filed: Feb. 26, 2007

(51) Int. Cl.
*A47C 7/00* (2006.01)

(52) U.S. Cl. ............... 297/440.2; 297/463.1; 297/463.2; 403/267; 403/409.1; 403/381; 312/111

(58) Field of Classification Search ............ 297/463.1, 297/463.2, 440.2, 440.22, 440.21; 108/153.1, 108/154, 180; 403/266, 267, 409.1, 381; 312/111, 140, 265.5; 52/582.1, 582.2, 586.1, 52/586.2

See application file for complete search history.

(56) References Cited

U.S. PATENT DOCUMENTS

| | | | | |
|---|---|---|---|---|
| 4,436,342 A | * | 3/1984 | Nilson et al. ............. | 297/446.1 |
| 4,639,042 A | * | 1/1987 | Lange ..................... | 297/440.2 |
| 5,018,789 A | * | 5/1991 | Sheckells ................. | 297/440.2 |
| 5,433,416 A | * | 7/1995 | Johnson ................... | 248/475.1 |
| 5,810,505 A | * | 9/1998 | Henriott et al. ............ | 403/230 |
| 5,865,562 A | * | 2/1999 | Mallek ....................... | 403/403 |
| 6,659,563 B2 | * | 12/2003 | Float et al. ............... | 297/440.2 |
| 6,843,529 B2 | * | 1/2005 | Ballendat .................... | 297/239 |

FOREIGN PATENT DOCUMENTS

GB 2038622 * 7/1980

* cited by examiner

*Primary Examiner*—Laurie K. Cranmer
(74) *Attorney, Agent, or Firm*—Luedeka, Neely & Graham, P.C.

(57) ABSTRACT

A chair comprises a seat, legs for supporting the seat, a backrest frame connected to the legs, and a backrest attached to the backrest frame. The backrest includes a backrest panel and backrest inserts. The backrest panel has slots extending inwardly from peripheral edges of the backrest panel. Each insert is configured for sliding insertion into a corresponding one of the backrest slots. The backrest is secured to the backrest frame by fasteners that pass through the backrest frame and into a corresponding one of the backrest inserts. The backrest inserts may be formed of a sturdy plastic to provide a secure anchor point for the fasteners. This provides a significant advantage for chairs having backrest panels constructed from relatively soft materials, such as pressed wood fiberboard. With the fasteners driven into the inserts, rather than directly into the soft backrest panel, any pulling or shearing loads on the fasteners are transferred to the interface between the inserts and the slots in the backrest panel.

16 Claims, 5 Drawing Sheets

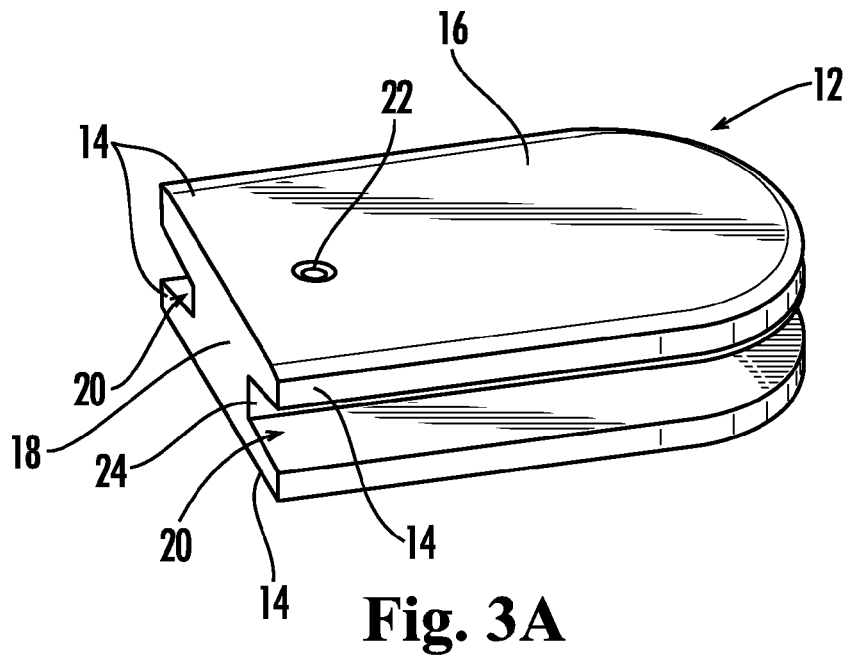
Fig. 3A
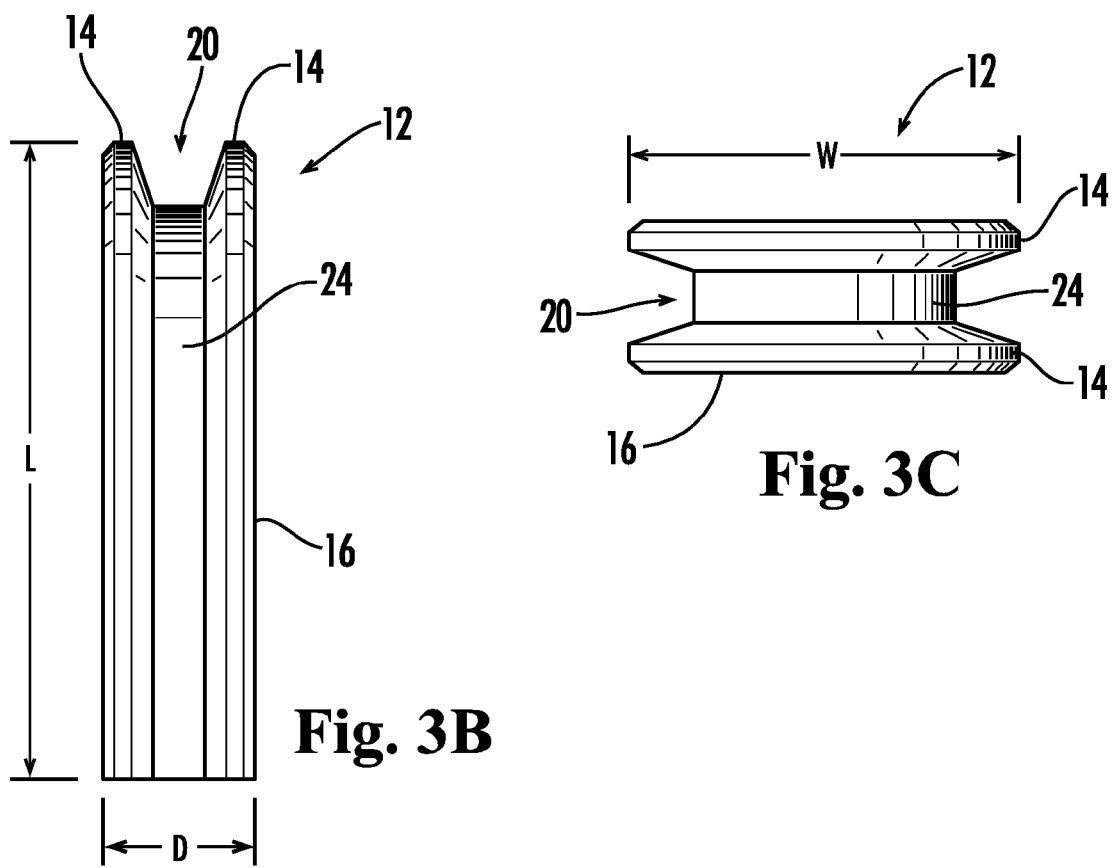
Fig. 3B
Fig. 3C

CHAIR BACKREST ATTACHMENT STRUCTURE

FIELD

This invention relates to the field of furniture. More particularly, this invention relates to an apparatus and method for attaching a chair backrest structure to a chair frame.

BACKGROUND

Many chair designs of the type generally used in banquet halls, auditoriums and restaurants generally comprise a metal frame with a seat and a backrest attached thereto. In many prior designs, the seat and backrest comprise pressed fiberboard panels with padding covered by fabric or vinyl upholstery. The seat and backrest usually attach to the frame by way of screws inserted through brackets on the frame, which screws are driven into the back or underside of the pressed fiberboard panels.

The points of attachment of the screws in the backrest and seat has been a constant problem in prior designs. This is because of the tendency of the screw threads to be extracted from the relatively soft press fiberboard when subjected to a pulling or shear load.

What is needed, therefore, is a structure which provides enhanced security at the points of attachment between the chair frame and the chair backrest and seat.

SUMMARY

The above and other needs are met by a chair comprising a seat, legs for supporting the seat, a backrest frame connected to one or more of the legs, and a backrest attached to the backrest frame. The backrest includes a backrest panel and backrest inserts. The backrest panel has a plurality of slots extending inwardly from one or more peripheral edges of the backrest panel. The inserts are configured for sliding insertion into corresponding backrest slots. The backrest is secured to the backrest frame by way of fasteners that pass through at least a portion of the backrest frame and into corresponding backrest inserts.

In some preferred embodiments, each backrest insert includes a peripheral channel disposed along a peripheral edge of the insert. The slots in the backrest panel include a peripheral tab extending into the slot. The peripheral tab is received into the peripheral channel of a corresponding backrest insert when the backrest insert is engaged with the backrest slot.

The backrest inserts, which may be formed of a sturdy plastic or metal, provide a secure anchor point for the fasteners that attach the backrest to the backrest frame. This provides a significant advantage for chair designs that incorporate a backrest panel constructed from relatively soft materials, such as pressed wood fiberboard. With the fasteners driven into the relatively sturdy inserts, rather than directly into the soft backrest panel material, any pulling or shearing loads on the fasteners are transferred to the interface between the inserts and the slots in the backrest panel. This design provides a stronger and more reliable backrest attachment structure than has been previously available.

One embodiment of the invention provides a backrest for a chair. The backrest includes a backrest panel having a plurality of backrest slots extending inwardly from one or more peripheral edges of the backrest panel. Each backrest slot includes a peripheral tab extending into the backrest slot. The backrest also includes a plurality of backrest inserts configured for sliding insertion into corresponding backrest slots. Each backrest insert includes a peripheral channel disposed along its peripheral edge. In this embodiment, the peripheral tab of each backrest slot is received into the peripheral channel of a corresponding backrest insert when the backrest insert is engaged with the backrest slot.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein:

FIGS. 3A-3E depict a chair backrest insert according to a preferred embodiment of the invention.

DETAILED DESCRIPTION

Figure 1:
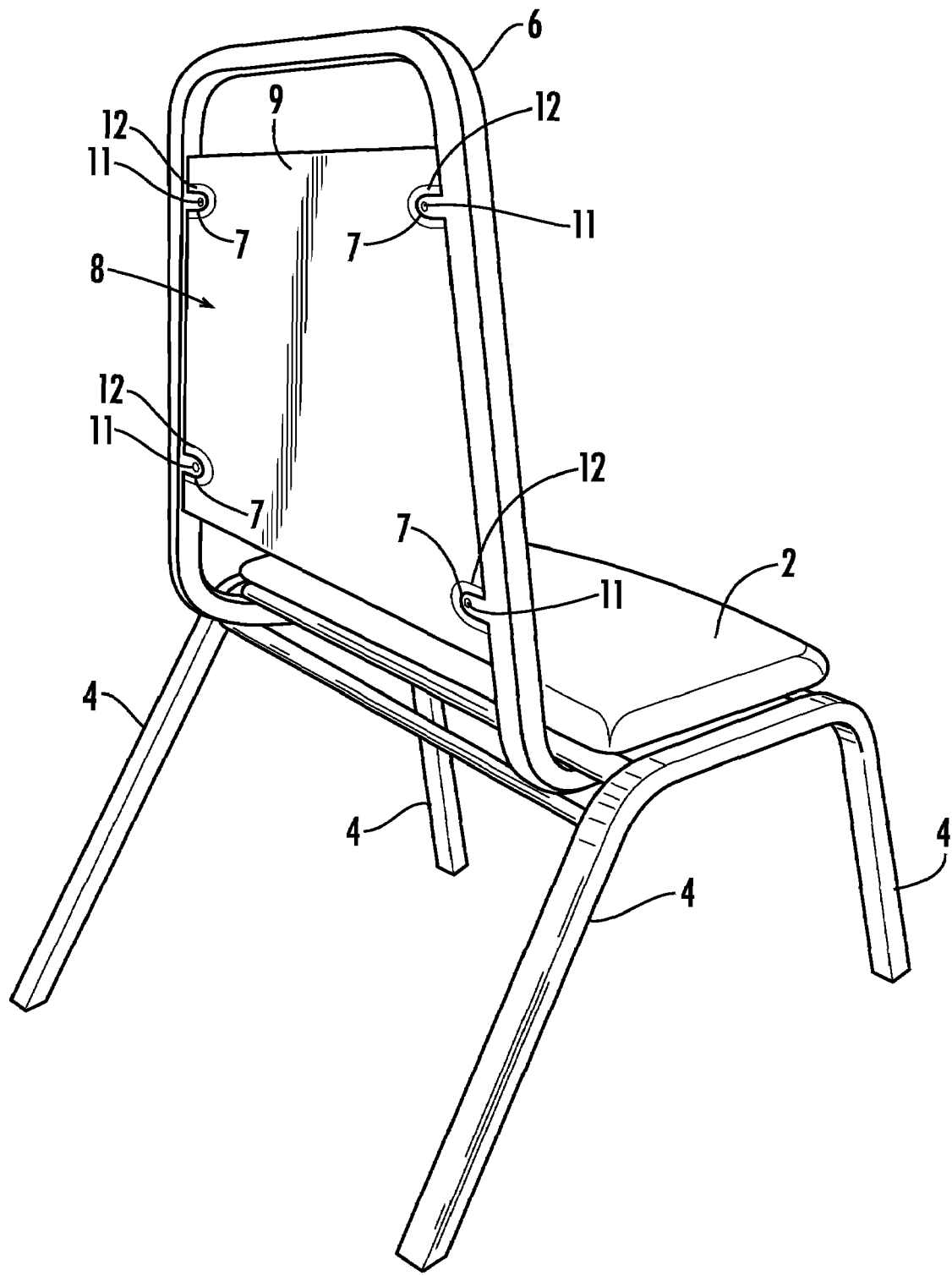
FIG. 1 depicts a chair according to a preferred embodiment of the invention.

The present invention is generally applicable to any chair or stool design wherein a backrest is attached to a frame. FIG. 1 depicts an example of one embodiment of the invention incorporated into a chair design. As shown in FIG. 1, a chair 10 includes a seat 2, legs 4 and a backrest frame 6. The backrest frame 6 supports a backrest 8 in a substantially upright position relative to the seat 2. In the depicted embodiment, the backrest 8 is attached to the backrest frame 6 by brackets 7 which are welded or otherwise rigidly affixed to the backrest frame 6. The backrest 8 is secured to the backrest frame 6 by way of fasteners 11, such as screws, which pass through holes in the brackets 7 and into the backrest 8.

Figure 2:
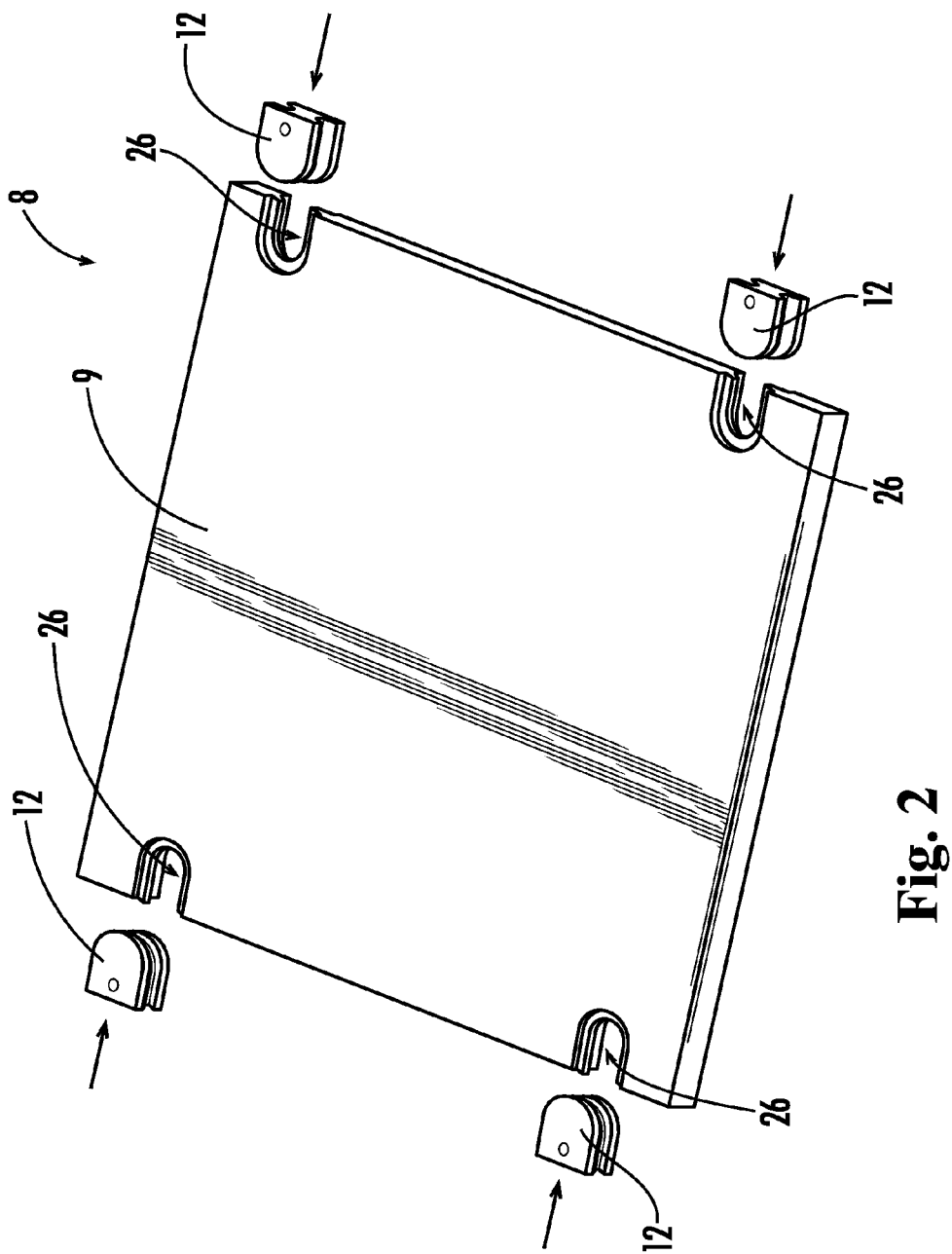
FIG. 2 depicts a chair backrest structure according to a preferred embodiment of the invention.

As shown in FIGS. 1 and 2, the backrest 8 of a preferred embodiment of the invention comprises a backrest panel 9 and backrest inserts 12. The backrest panel 9 is preferably formed of a substantially rigid material, such as pressed wood fiberboard, which may also be referred to as particle board. In alternative embodiments, the backrest panel 9 may be formed of solid wood, wood laminate, pressed plastic fiberboard, injection-molded plastic or blow-molded plastic. The backrest panel 9 includes slots 26 for receiving the inserts 12. The slots 26 are positioned in the panel 9 to correspond to the positions of points of attachment to the backrest frame 6, such as the brackets 7 affixed to the backrest frame 6. The backrest panel 9 may be in the shape of a rectangle, trapezoid, truncated ellipse or any other shape which generally corresponds to the shape of the backrest frame 6.

Figure 3D:
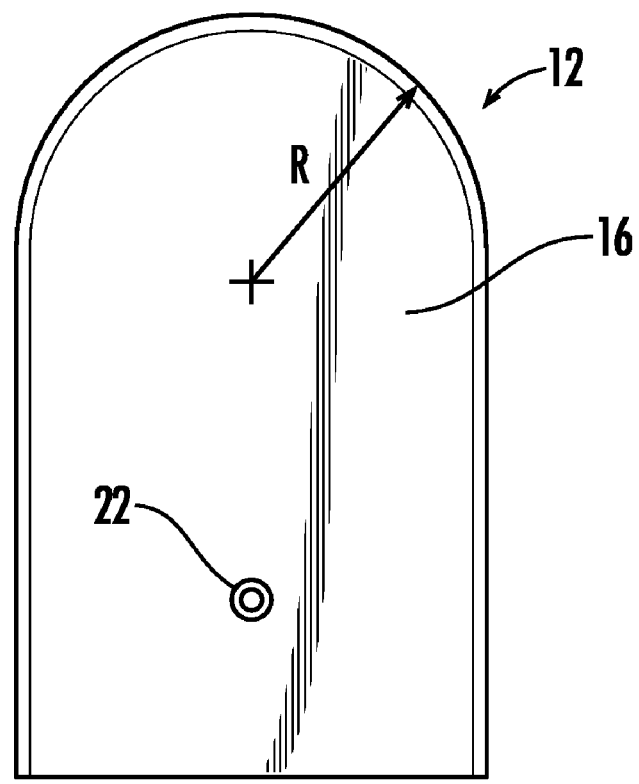

In a preferred embodiment of the invention, the backrest inserts 12 are constructed from plastic and are formed by injection molding. However, it will be appreciated that the inserts 12 may be formed of other materials, such as metal or wood. As shown in FIGS. 3A and 3D, each backrest insert 12 has opposing outer surfaces 16 which are generally in the shape of a truncated oval. However, the inserts 12 may also be in the shape of a rectangle, trapezoid or any other shape compatible for insertion into the slots 26 of the backrest panel 9. In a preferred embodiment, the radius R of curvature of the oval portion is about 11.5 mm. As shown in FIGS.

3B and 3C, the inserts 12 have an overall length L, an overall depth D and an overall width W. In a preferred embodiment, L is 27.5 mm, W is 23 mm and D is 10 mm. It will be appreciated that these dimensions are recited merely to give an example of one embodiment of the invention, and that the invention is not limited to any particular dimensional configuration. As shown in FIGS. 3A-3E, the peripheral edges of the outer surfaces 16 are preferably beveled.

Figure 3E:
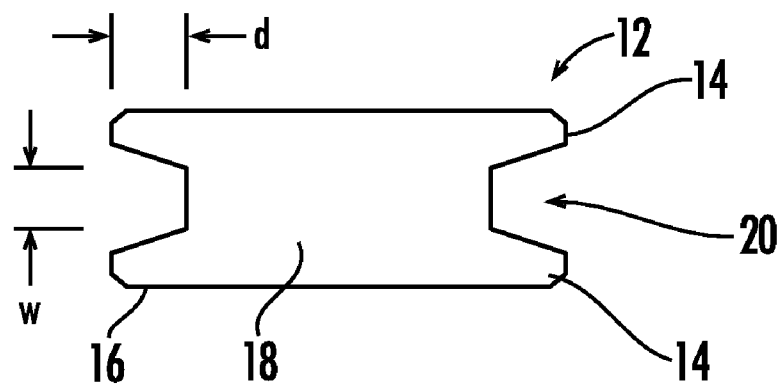

Each insert 12 includes a peripheral channel 20 extending around at least a portion of the periphery of the insert 12. The channel 20 is bounded by opposing extensions 14 and an interior wall 24. As shown in FIG. 3E, the inner walls of the extensions 14 are preferably tapered (such as at about 20°), thereby forming the channel 20 having a width w that varies from about 3.6 mm to about 5 mm in a preferred embodiment. The depth d of the channel 20 is about 4 mm in a preferred embodiment. The insert 12 has an end surface 18 which is preferably perpendicular to the outer surfaces 16.

In some embodiments of the invention, a hole 22 is provided in one or both of the opposing surfaces 16 of the inserts 12 for receiving a fastener 11 passed through the backrest frame 6. (See FIG. 1.) In one embodiment of the invention, the hole 22 is a through hole, which is accessible from either of the opposing surfaces 16 of the insert 12. Since the hole 22 goes all the way through the insert 12, the insert 12 is symmetrical, having no designated "top" or "bottom," and it can receive a fastener 11 inserted into either side. This embodiment simplifies the assembly process since it does not matter which way the insert 12 is oriented when it is inserted into the slot 26. In an alternative embodiment, the hole 22 is a blind hole provided in only one of the surfaces 16 of the insert 12.

In a preferred embodiment of the invention, no hole is provided in either surface 16 of the inserts 12. In this embodiment, self-tapping fasteners 11, such as self-tapping screws, are used to attach the backrest frame 6 to the inserts 12.

Figure 4B:
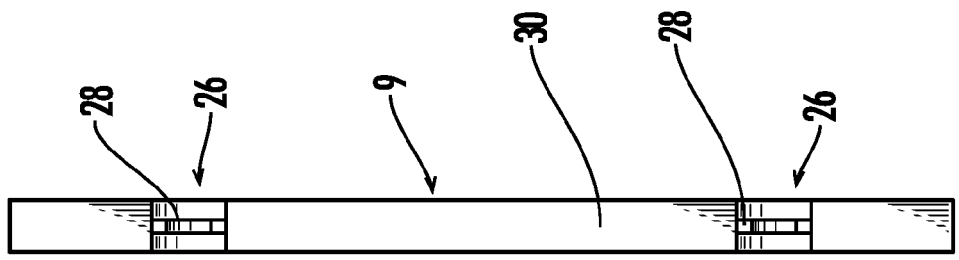
FIGS. 4A-4B depict a chair backrest panel according to a preferred embodiment of the invention.
Figure 4A:
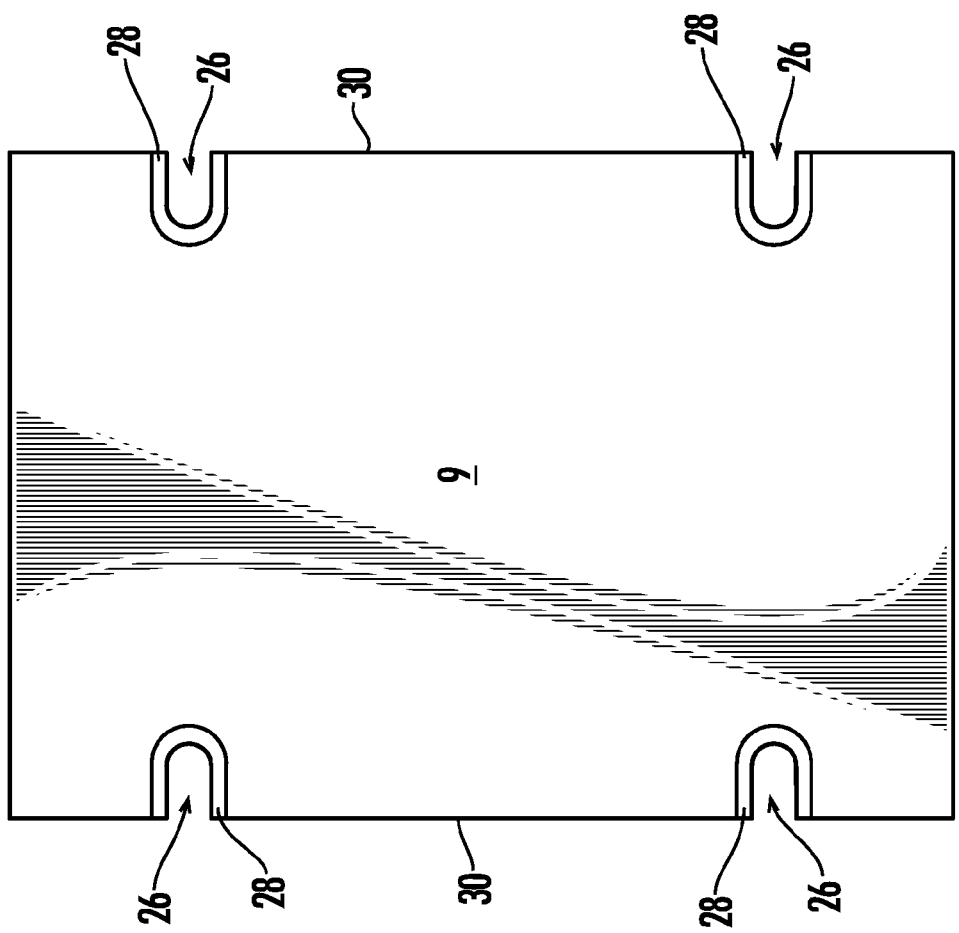

As shown in FIGS. 4A-4B, the backrest panel 9 includes some number of the slots 26 corresponding to the number of backrest attachment points provided on the backrest frame 6. In the preferred embodiment, there are four slots 26. Each slot 26 preferably has a shape corresponding to the shape of the insert 12, such as the truncated oval depicted in the figures. However, it will be appreciated that the slots 26 may have any shape that is compatible with the shape of the inserts 12 received within the slots 26. The width and depth dimensions of each slot 26 is selected to substantially match the dimensions of the insert 12. Each slot 26 preferably includes an inner peripheral tab 28 that is received within the peripheral channel 20 of the insert 12 when the insert 12 is engaged with the slot 26. To ensure a secure engagement of the insert 12 into the slot 26, the outer dimensions of the tab 28 closely match the inner dimensions of the channel 20. This tab and channel structure provides for the surfaces 16 of the backrest inserts 12 to be substantially flush with the surfaces of the backrest panel 9.

During assembly of the chair 10, each insert 12 slides into the corresponding slot 26 of the backrest panel 9 until the end surface 18 of the insert 12 is substantially flush with the outer edge 30 of the panel 9. The backrest 8 is then engaged with the chair frame 6 so that the holes in the brackets 7 align with the holes 22 in the inserts 12. Fasteners 11, such as self-tapping screws, are then inserted through the holes in the brackets 7 and are driven into the holes 22 of the inserts 12.

Those skilled in the art will appreciate the advantage provided by the inserts 12, particularly in situations where the backrest panel 9 is constructed from a relatively soft material, such as pressed wood fiberboard. Without the inserts 12, the fasteners 11 attaching the backrest panel 9 to the backrest frame 6 would have to be driven directly into the backrest panel 9. Screws driven into pressed wood fiberboard are notorious for working loose under repeated pulling loads or shearing loads. By driving the fasteners 11 into plastic or metal inserts 12 instead of directly into the relatively soft panel 9, the loosening problem is solved. When the backrest frame 6 is attached to the inserts 12, pulling and shearing loads are transferred from the fasteners 11 to the inserts 12, and those loads are spread over the interface between the inserts 12 and the slots 26. This design provides a stronger and more reliable backrest attachment structure than has been previously available.

In the embodiment of the invention depicted in FIG. 1, the backrest frame 6 has brackets 7 that extend inwardly. In this embodiment, the backrest 8 is attached to the frame 6 by passing fasteners through holes in the brackets 7 and into the backrest 8. In alternative embodiments wherein the frame 6 does not include brackets, the backrest 8 is attached to the frame 6 by passing fasteners through holes in the frame 6 and into the backrest 8. Thus, it will be appreciated that the invention is not limited to the use of a bracket structure on the frame 6.

In the embodiment of the invention depicted in FIGS. 2-4, the channel 20 is provided in the edge of the insert 12, and the tab 28 in the slot 26 engages the channel 20. In an alternative embodiment of the invention, a channel is provided in the inner peripheral edge of the slot 26, and a tab on the peripheral edge of the insert 12 engages the channel. Thus, it should be appreciated that various embodiments of the invention are not limited by the location of the tab or the slot.

In the embodiment of the invention depicted in FIGS. 2 and 3, the insert 12 slides into the slot 26 from the peripheral edge 30 of the backrest panel 9 in a direction parallel to the front and rear surfaces of the panel 9. In an alternative embodiment of the invention, the inserts and slots are configured to allow the inserts to slide into the slots from the front side of the backrest panel, where the sliding motion is in a direction perpendicular to the front and rear surfaces of the panel 9. In this alternative embodiment, the insert 12 includes an extension 14 on only one side of the channel 20, so that the insert 12 can be inserted into the slot 26 from the front of the panel 9. Thus, it should be appreciated that various embodiments of the invention are not limited by the direction from which the insert 12 engages the slot 26 in the backrest panel 9.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A chair comprising:
   a seat;
   legs for supporting the seat;
   a backrest frame connected to one or more of the legs; and
   a backrest attached to the backrest frame, the backrest comprising:
     a backrest panel having a plurality of slots extending inwardly from one or more peripheral edges of the backrest panel; and
     a plurality of backrest inserts, each configured for sliding insertion into a corresponding one of the backrest slots;
     where the backrest is secured to the backrest frame by way of a plurality of fasteners, each fastener passing through at least a portion of the backrest frame and into a corresponding one of the backrest inserts.

2. The chair of claim 1 wherein
   one or more of the backrest inserts include a peripheral channel disposed along a peripheral edge of the backrest insert, and
   one or more of the slots in the backrest panel include a peripheral tab extending into the slot, where the peripheral tab is received into the peripheral channel of a corresponding backrest insert when the backrest insert is engaged with the backrest slot.

3. The chair of claim 2 wherein the peripheral channel is bounded by opposing extensions that taper in thickness from an inner portion of the peripheral channel to an outer portion of the peripheral channel.

4. The chair of claim 1 wherein one or more of the backrest inserts include an end surface that is substantially aligned with the peripheral edge of the backrest panel when the backrest insert is engaged with the corresponding slot in the backrest panel.

5. The chair of claim 1 wherein one or more of the backrest inserts are formed in the shape of a truncated oval having two opposing parallel edges and a half-circular edge disposed between the opposing parallel edges.

6. The chair of claim 5 wherein one or more of the backrest inserts include a continuous peripheral channel disposed along the two opposing parallel edges and the half-circular edge.

7. The chair of claim 1 wherein the backrest inserts are formed of injection molded plastic.

8. The chair of claim 7 wherein the backrest panel is formed of pressed wood fiber board.

9. The chair of claim 1 wherein each backrest insert includes at least one hole for receiving at least one of the fasteners.

10. The chair of claim 1 wherein one or more of the slots in the backrest panel are formed in the shape of a truncated oval having two opposing parallel edges and a half-circular edge disposed between the opposing parallel edges.

11. The chair of claim 10 wherein one or more of the slots in the backrest panel include a peripheral tab extending into the slot, the peripheral tab formed along the two opposing parallel edges and the half-circular edge.

12. The chair of claim 1 comprising one or more brackets attached to the backrest frame, wherein the backrest is secured to the backrest frame by way of fasteners passing through one or more of the brackets and into the backrest inserts.

13. The chair of claim 1 wherein the backrest inserts are configured for sliding insertion into the slots from the peripheral edge of the backrest panel, where the insertion is made in a direction parallel to the backrest panel.

14. The chair of claim 1 wherein the backrest inserts are configured for sliding insertion into the slots from a forward surface of the backrest panel, where the insertion is made in a direction perpendicular to the backrest panel.

15. A chair comprising:
    a seat;
    legs for supporting the seat;
    a backrest frame connected to one or more of the legs; and
    a backrest attached to the backrest frame, the backrest comprising:
      a backrest panel;
      slot means in the backrest panel, the slot means for receiving insert means in the backrest panel; and
      the insert means for sliding insertion into the slot means, the insert means for receiving fasteners that attach the backrest panel to the backrest frame.

16. A backrest for a chair, the backrest comprising:
    a backrest panel having a plurality of backrest slots extending inwardly from one or more peripheral edges of the backrest panel, each backrest slot including a peripheral tab extending into the backrest slot; and
    a plurality of backrest inserts configured for sliding insertion into corresponding backrest slots, each backrest insert including a peripheral channel disposed along a peripheral edge of the backrest insert;
    where the peripheral tab of each backrest slot is received into the peripheral channel of a corresponding backrest insert when the backrest insert is engaged with the backrest slot.

* * * * *